United States Patent [19]

Iseki et al.

[11] Patent Number: 5,535,801

[45] Date of Patent: Jul. 16, 1996

[54] PNEUMATIC TIRE WITH ZIGZAG CORD BELT

[75] Inventors: Tsutomu Iseki, Fukushima-ken; Masayuki Sakamoto, Shirakawa, both of Japan

[73] Assignee: Simitomo Rubber Industries, Ltd., Hyogo-ken, Japan

[21] Appl. No.: 272,310

[22] Filed: Jul. 8, 1994

Related U.S. Application Data

[63] Continuation of Ser. No. 783,125, Oct. 28, 1991, abandoned.

[30] Foreign Application Priority Data

Nov. 6, 1990 [JP] Japan ..................... 2-301659

[51] Int. Cl.⁶ ................... B60C 9/20; B60C 9/26
[52] U.S. Cl. ............ 152/528; 152/526; 152/533; 156/117
[58] Field of Search ................ 152/533, 535, 152/526–528; 156/117, 177, 173, 175

[56] References Cited

U.S. PATENT DOCUMENTS

| | | |
|---|---|---|
| 2,982,327 | 5/1961 | Vanzo et al. . |
| 3,563,296 | 2/1971 | Wells . |
| 3,770,042 | 11/1973 | Greene et al. . |
| 3,830,276 | 8/1974 | Smithkey, Jr. . |
| 4,002,739 | 1/1977 | Klein . |
| 4,745,957 | 5/1988 | Summer .................. 156/117 X |
| 4,838,966 | 6/1989 | Oswald ..................... 152/533 X |
| 5,427,167 | 6/1995 | Watanabe et al. .......... 152/533 X |
| 5,465,773 | 11/1995 | Kadota et al. .............. 152/533 X |

FOREIGN PATENT DOCUMENTS

| | | |
|---|---|---|
| 222239 | 1/1958 | Australia ................ 152/533 |
| 27765/77 | 2/1979 | Australia . |
| 2361230 | 3/1978 | France . |
| 58-160805 | 10/1983 | Japan . |

Primary Examiner—Adrienne C. Johnstone
Attorney, Agent, or Firm—Birch, Stewart, Kolasch & Birch

[57] ABSTRACT

A pneumatic tire which comprises a belt disposed radially outside a carcass and inside a tread and having opposite axial edges, the belt comprising a cord continuously wound around the carcass while running zigzag between the edges of the belt to defining cord segments extending between the edges of the belt, the cord segments including first cord segments and second cord segments, the first cord segments laid substantially parallel with each other, and the second cord segments laid substantially parallel with each other and crosswise to the first cord segments.

11 Claims, 6 Drawing Sheets

PNEUMATIC TIRE WITH ZIGZAG CORD BELT

This application is a continuation, of application Ser.No. 07/783,125 filed on Oct. 28, 1991, now abandoned.

BACKGROUND OF THE INVENTION

The present invention relates to a pneumatic tire and more particularly an improvement in a tread reinforcing belt.

In general, a pneumatic tire is provided radially outside the carcass with a belt to reinforce the tread portion.

In a conventional belt structure, as shown in FIGS. 7 and 8, a belt ply (p) is formed by applying a strip (e) of rubberized parallel cords (b) around the carcass. A strip (e) of rubberized parallel cords (b) is made by cutting a sheet of tire fabric (d) at a bias angle ($\alpha$). The ends (f) of the applied strip (e) are jointed by overlapping one upon the other by a certain width, and a joint running at the bias angle ($\alpha$) is formed, and further two side edges with cord cut ends are formed. Therefore, due to the bias joint, steering stability and directional stability during straight running are liable to be disturbed. It is especially remarkable during high speed running. Further, durability is impaired due to the cord cut ends from which rubber separation failure arises.

In order to solve those problems, a jointless belt formed by spirally winding a continuous cord around the carcass at a small angle to the tire equator has been proposed in, for example, Japanese Utility-Model Publication No. 58-160805. However, due to the spiral cord arrangement, drifting toward a certain direction is liable to occur.

SUMMARY OF THE INVENTION

It is therefore, an object of the present invention to provide a pneumatic tire which can solve the problems of stability, durability and drifting.

According to one aspect of the present invention, a pneumatic tire comprises a carcass extending between beads, and a belt disposed radially outside the carcass and inside a tread and having opposite axial edges, wherein the belt comprises at least one cord continuously wound around the carcass while running zigzag between the edges of the belt to define cord segments extending between the edges of the belt, the cord segments including first cord segments and second cord segments, the first cord segments laid substantially parallel with each other, and the second cord segments laid substantially parallel with each other and crosswise to the first cord segments.

BRIEF DESCRIPTION OF THE DRAWINGS

Embodiments of the present invention will now be described in detail in conjunction with the accompanying drawings, in which.

DETAILED DESCRIPTION OF THE INVENTION

Figure 1:
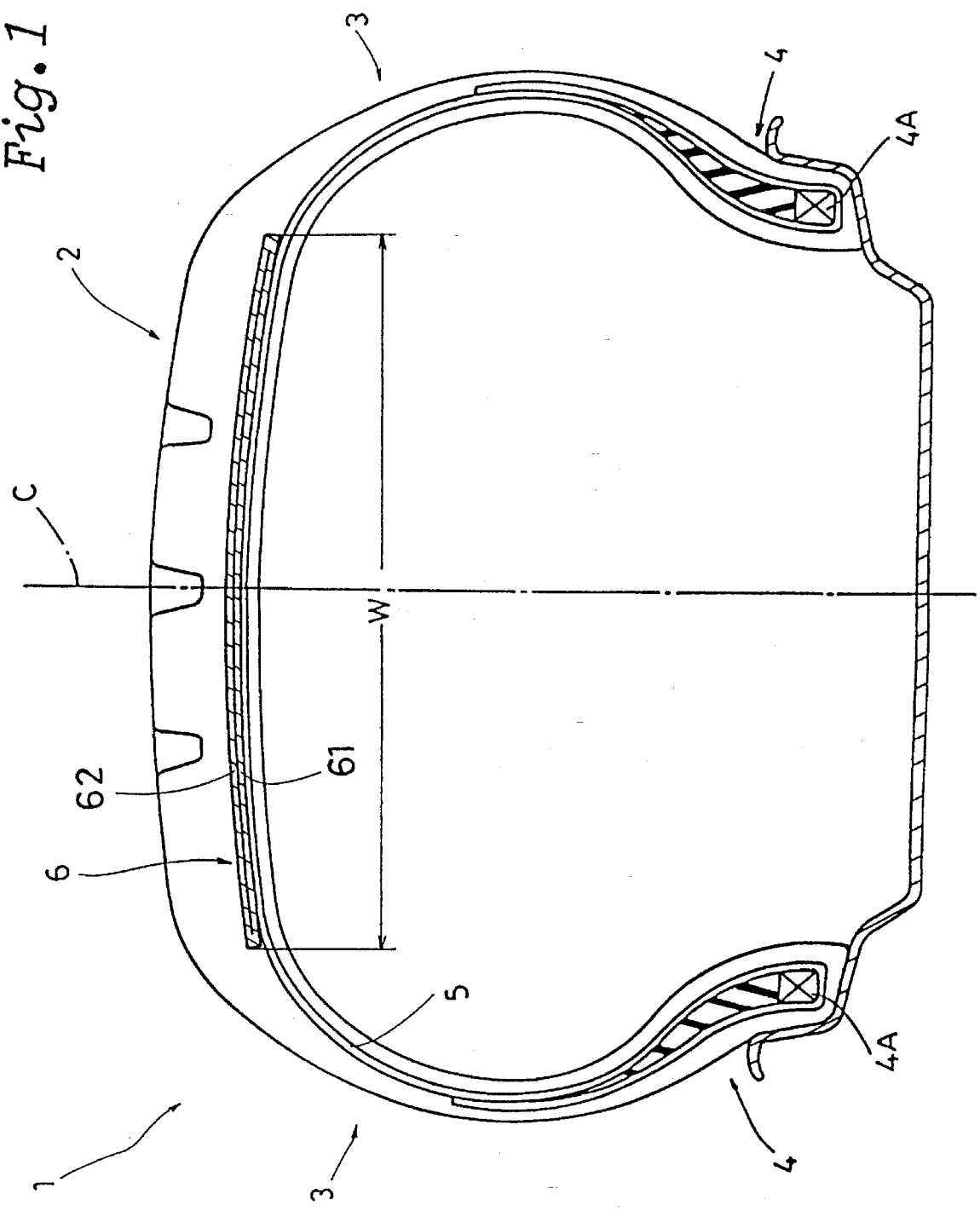
FIG. 1 is a cross sectional view of a tire according to the present invention.

In the figures, pneumatic tire 1 has a tread portion 2, a pair of axially spaced bead portions 4, and a pair of sidewall portions 3 extending between the tread edges and the bead portions.

The tire 1 comprises a bead core 4A disposed in each bead portion 4, a toroidal carcass 5 extending between the bead portions 4 and turned up around the bead cores 4A, and an jointless belt 6 disposed radially outside the carcass 5 and inside the tread.

The carcass 5 in this embodiment comprises one ply of organic fiber cords, e.g. nylon, aromatic polyamide and the like, arranged radially at an angle of 60 to 90 degrees with respect to the tire equator C so as to provide a radial or a so called semiradial ply construction.

The belt 6 comprises at least one continuous cord which is wound at least once around the carcass while running zigzag from the one edge to the other edge of the belt, so that the or each belt cord has first parallel cord segments inclined at a bias angle ($\alpha$) with respect to the tire equator and second parallel cord segments inclined at the same bias angle ($\alpha$) but in a symmetrical direction with respect to the tire equator, wherein the cord segments mean substantially straight cord portions defined as extending from one edge to the other edge of the belt. By such arrangement of the cord segments, the first cord segments cross the second cord segments.

Figure 2:
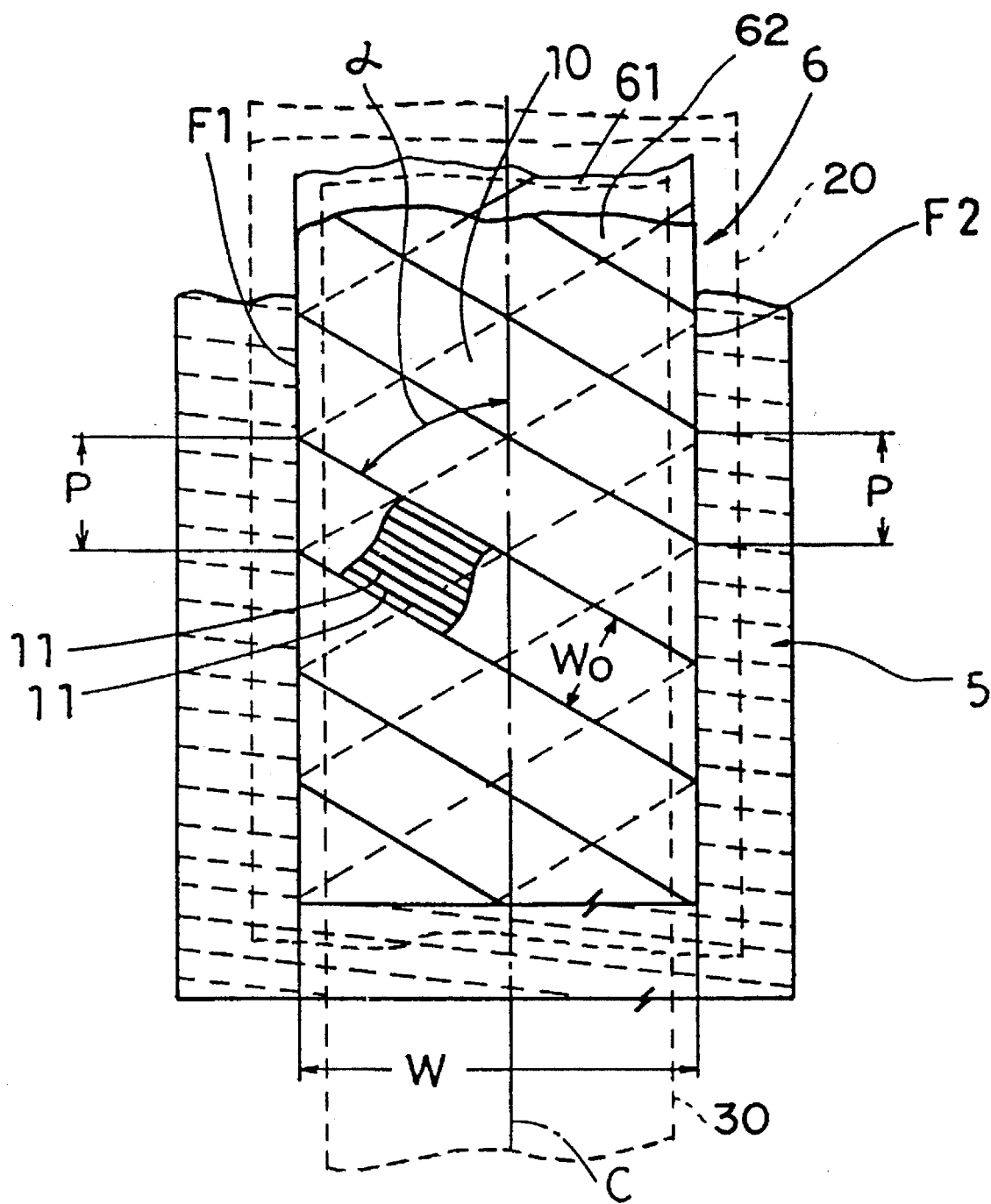
FIG. 2 is a developed plan view of a belt and a carcass.

FIG. 2 shows a first example for the belt 6, in which several parallel cords 11 are wound together several times around the carcass. In this example, the first parallel cord segments 61 are located radially inside the second parallel cord segments 62.

Figure 3:
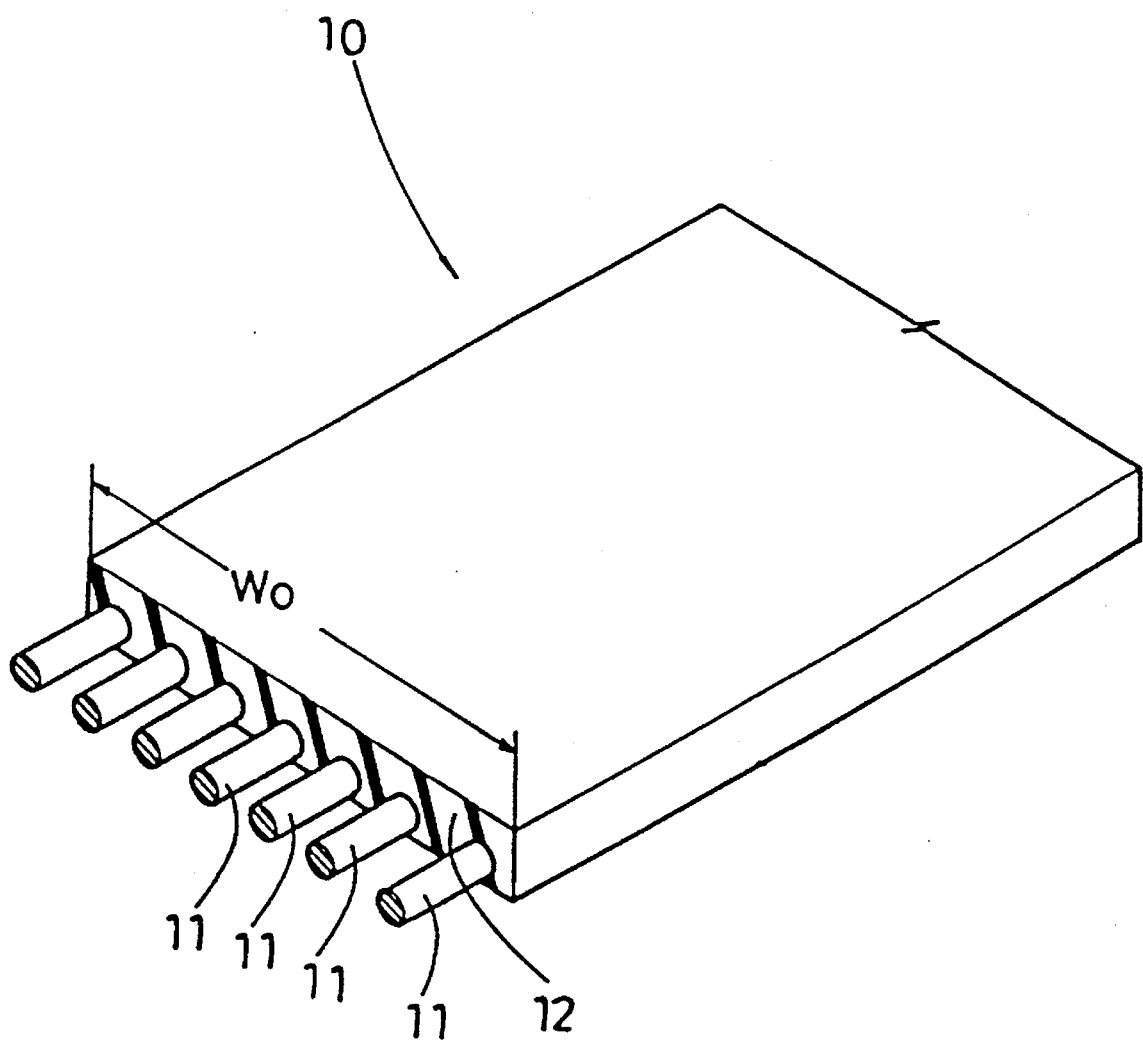
FIG. 3 is a perspective view of a ribbon of rubber used to form the belt.

FIG. 3 shows a ribbon 10 of rubber. In order to make the belt, such ribbon is used. In the ribbon, one belt cord or parallel belt cords 11 are embedded in coating rubber 12.

The number of the embedded cords 11 is set in the range of 1 to 10. In the example shown in FIG. 3, the number is 7, and the cross sectional shape of the ribbon 10 is a flat rectangle.

Preferably, the width Wo of the ribbon 10 is set in the range of 5 to 15 mm.

For the belt cords 11, organic fiber cords, e.g. nylon, polyester, aromatic polyamide and the like or steel cords can be used. Preferably, aromatic polyamide fiber cords are used for their high modulus which corresponds to that of steel cords and light weight.

Figure 4:
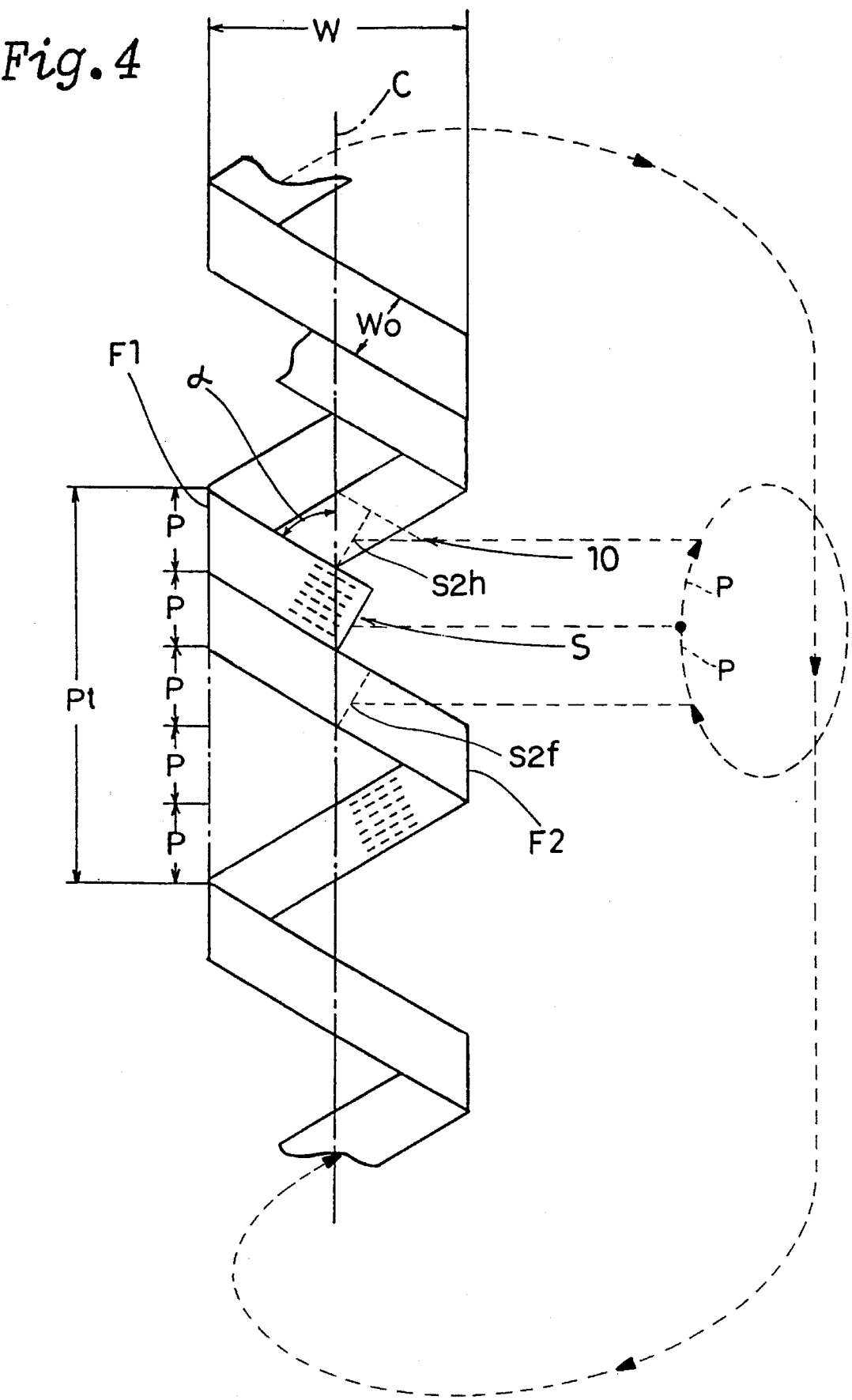
FIG. 4 is a developed plan view showing a method of making the belt.

FIG. 4 shows a method of making the belt 6 shown in FIG. 2, wherein one ribbon 10 is wound plural times (n) as follows:

In the first winding, the ribbon extends at the angle ($\alpha$) from a starting point S to the other left side belt edge F1;
  A) at the other left side edge F1, the ribbon is folded back radially inwardly;
  B) the ribbon extends at the angle ($\alpha$) to the right side edge F2;
  C) at the right side edge F2, the ribbon is folded back radially outwardly;

D) the ribbon extends at the angle (α) to the left side belt edge F1;

A) to D) are repeated until the ribbon returns to the imaginary starting point of the second winding which point S2fis adjacent to the previous starting point S.

In the subsequent second winding and third, fourth, through the last (n)th windings, the ribbon is wound in the same way as the first winding.

By winding the ribbon (n)-times, the belt becomes tight. In other words, no space is formed between the circumferentially adjacent ribbon segments (used in the same sense as the above-mentioned cord segments).

The zigzag pitch Pt in the circumferential direction of the tire is (n) times the the circumferential width P of the ribbon.

For the second through the last windings, each of the starting points therefor is located before the previous starting point. That is, the circumferential length of one winding is smaller than that of the belt, and the difference therebetween is the circumferential width P of the ribbon ($P=Wo/\sin(\alpha)$).

After the (n)-time winding of the ribbon, the terminal end thereof returns to the first starting point S and is jointed with the starting end.

As described above, in this example, the ribbon is always folded back from radially outward to inward at the left side edge F1 and from radially inward to outward at the right side edge F2. Accordingly, the ribbon is wound spirally and continuously around the thickness central plane of the belt while being wound around the carcass generally. This spiral-folding type belt is formed separately from the carcass, and thereafter they are assembled.

Figure 5:
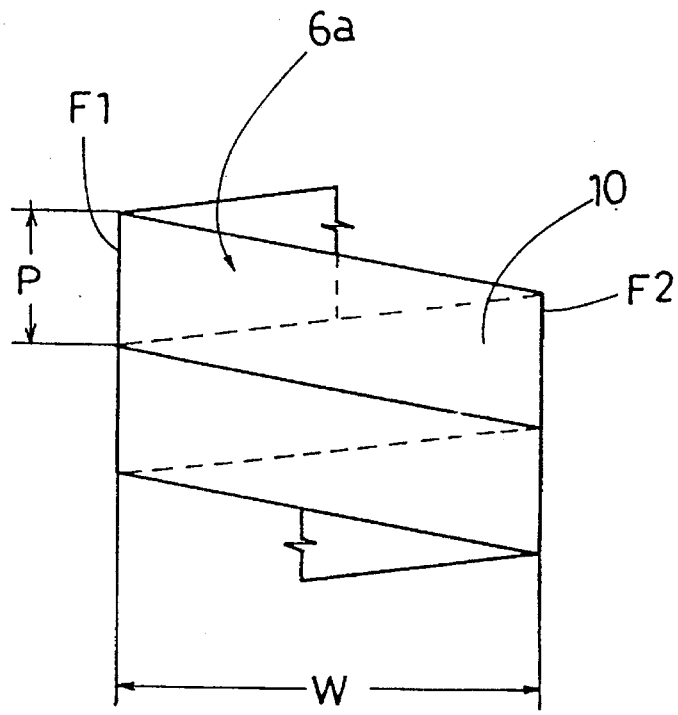
FIG. 5 is a developed plan view of another example of the belt.

FIG. 5 shows a modification of the above-explained belt 6. In this belt 6a, the zigzag pitch Pt is equal to the circumferential width P of the ribbon, and accordingly the bias angle of the belt cords becomes larger, and the ribbon is wound once around the carcass.

Figure 6:
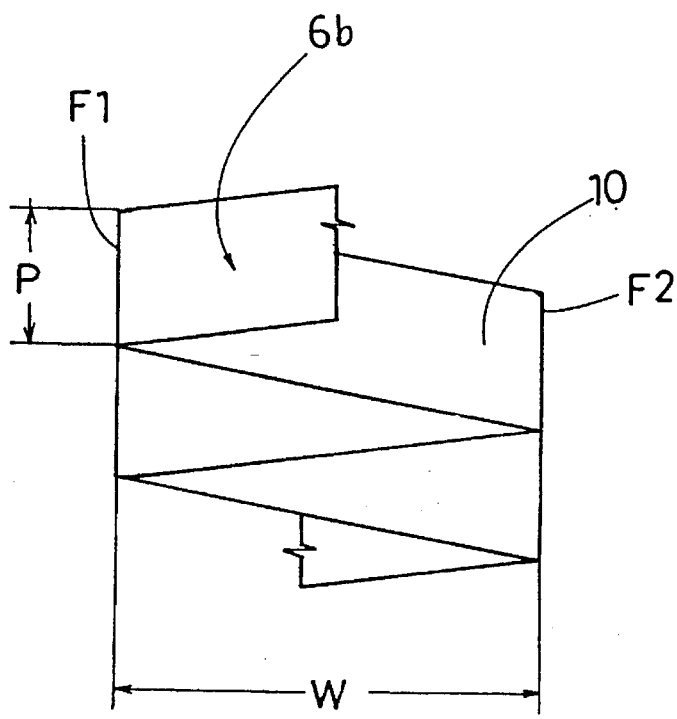
FIG. 6 is a developed plan view of still another example of the belt.
Figure 7:
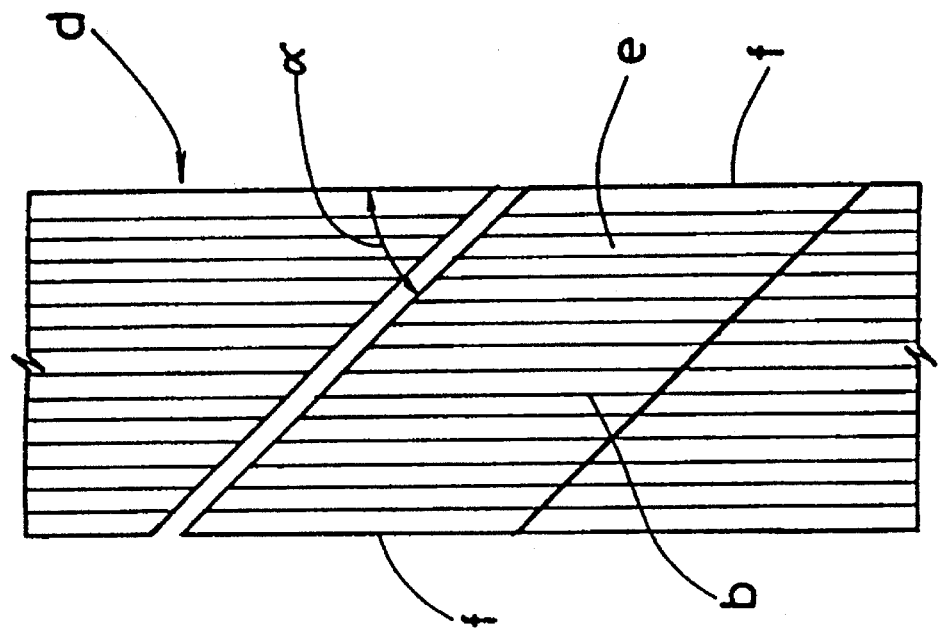
FIG. 7 is a developed plan view of a carcass and conventional belt structure.
Figure 8:
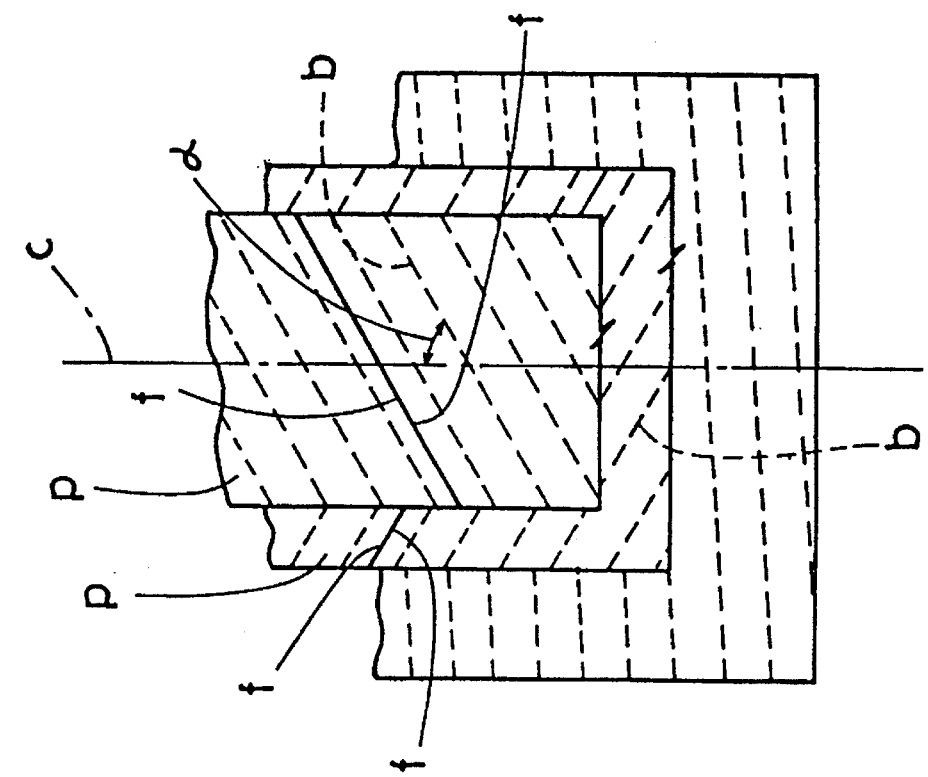
FIG. 8 is a plan view of the tire fabric used to form the conventional belt.

FIG. 6 shows a modification of the belt 6a shown in FIG. 5. In this belt 6b, the folding-back directions of the ribbon at the belt edges are altered such that the ribbon is folded back from radially inside to outside at both the edges F1 and F2, which makes it possible to form the belt 6b directly on the carcass. It is however, also possible to form separately from the carcass.

Such one-way folding can be applied to the first example belt 6.

Further, in the belts in which the ribbon is wound a plurality of times around the carcass, for example the belt 6 and the belt 6 combined with the one-way folding, the circumferential length of one winding of the ribbon can be larger than that of the belt. The difference therebetween is set to be the circumferential width P of the ribbon. In other words, the imaginary starting points S2h for the second (exemplarily shown in FIG. 4) to last of the windings are positioned behind and adjacently to the respective previous starting points.

The above-mentioned bias angle (α) of the ribbon 10 or belt cords 11 Is in the range of 10 to 80 degrees with respect to the tire equator.

In the above-mentioned examples, the edges of the adjacent ribbon segments are not overlapped. However, they may be slightly overlapped.

In the, above-mentioned one-way folding, after one belt layer is formed, that is the ribbon returns to the first starting point, a further layer 20 can be formed successively thereon by continuously winding the ribbon therearound. In such a case, the axial extent W of the zigzag is preferably changed to be narrower or wider than the other layer. Such further layer 20 is shown by imaginary lines in FIG. 2.

Further, in the spiral folding explained in the first and second example belts 6 and 6a, after one belt layer is formed, a further layer can be formed successively by continuously winding the ribbon around the previously formed belt layer.

Furthermore, a belt layer (shown by imaginary lines in FIG. 2) made of a strip of conventional tire fabric can be combined with the above-mentioned zigzag cord belts 6, 6a and 6b. For example, a fabric belt layer 30 is disposed between the radially outer segments 62 and the radially inner segments 61 of the zigzag cord belt formed by spiral folding, or a fabric belt layer is disposed radially outside or inside the zigzag cord belt.

As described above, in the pneumatic tire according to the present invention, the belt is provided with an endless structure with respect to the circumferential direction of the tire, and there is no cord cut end at the edges, and further, the first cord segments cross the second cord segments. Therefore, belt edge looseness and rubber separation are effectively prevented, and durability of the tread portion is improved. The endless structure and cross structure provide a rigid and uniform reinforcement for the tread portion, and straight running performance and steering stability are improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A pneumatic tire comprising a carcass extending between a pair of beads, and a belt disposed radially outside the carcass and inside a tread and having opposite first and second axial edges, the belt including at least one layer of a ribbon of rubber wound around the carcass while running zigzag between the first and second axial edges of the belt to define ribbon segments extending between the first and second axial edges of the belt, the ribbon being reinforced by a plurality of parallel cords embedded therein along the longitudinal direction thereof, whereby the belt includes the plurality of parallel cords continuously wound around the carcass while running zigzag between the first and second axial edges of the belt to define first and second cord segments extending between the first and second axial edges of the belt, the first cord segments laid substantially parallel with each other, and the second cord segments laid substantially parallel with each other and crosswise to the first cord segments, the radially outer surface of the first cord segments directly abutting with the radially inner surface of the second cord segments, the ribbon being folded back at the first axial edge from radially outward to inward and at the second axial edge from radially inward to outward, the number of the plurality of parallel cords being not more than 10, the width of the ribbon being in the range of from 5 to 15 mm, the zigzag pitch being substantially equal to the circumferential width of the ribbon multiplied by an integer, the integer being larger than one (1), the number of the continuous windings of the ribbon being equal to the integer, and the starting point for the winding of the ribbon being circumferentially before or circumferentially behind the starting point for the previous adjacent winding, whereby the ribbon segments are arranged tightly in the circumferential direction of the tire, wherein the belt further includes a layer made of a strip of conventional tire fabric.

2. A pneumatic tire comprising a carcass extending between a pair of beads, and a belt disposed radially outside the carcass and inside a tread and having opposite first and second axial edges, the belt including at least one layer of a ribbon of rubber wound around the carcass while running zigzag between the first and second axial edges of the belt to define ribbon segments extending between the first and second axial edges of the belt, the ribbon being reinforced by a plurality of parallel cords embedded therein along the longitudinal direction thereof, the number of parallel cords being not more than 10, and the width Wo of the ribbon is from 5 to 15 mm, whereby the belt includes the plurality of parallel cords continuously wound around the carcass while running zigzag between the first and second axial edges of the belt to define first and second cord segments extending between the first and second axial edges of the belt, the first cord segments laid substantially parallel with each other, and the second cord segments laid substantially parallel with each other and crosswise to the first cord segments, the radially outer surface of the first cord segments directly abutting with the radially inner surface of the second cord segments, the ribbon being folded back at the first axial edge from radially outward to inward and at the second axial edge from radially inward to outward, the zigzag pitch being substantially equal to the circumferential width of the ribbon multiplied by an integer, said integer being one (1), whereby the ribbon segments are arranged tightly in the circumferential direction of the tire, wherein the belt further includes a layer made of a strip of conventional tire fabric.

3. A pneumatic tire comprising a carcass extending between a pair of beads, and a belt disposed radially outside the carcass and inside a tread and having opposite first and second axial edges, the belt including two layers of a ribbon of rubber, a radially inner layer and a radially outer layer, the outer layer having a width different from the inner layer, the two layers being wound around the carcass while running zigzag between the first and second axial edges of the belt to define ribbon segments extending between the first and second axial edges of the belt, the outer layer being formed by winding the ribbon continuously from the inner layer in the same manner as the inner layer, but changing the axial extent W of the zigzag from that of the inner layer, the ribbon being reinforced by a plurality of parallel cords embedded therein along the longitudinal direction thereof, the number of parallel cords being not more than 10, and the width Wo of the ribbon is from 5 to 15 mm, whereby the belt includes the plurality of parallel cords continuously wound around the carcass while running zigzag between the first and second axial edges of the belt to define first and second cord segments extending between the first and second axial edges of the belt, the first cord segments laid substantially parallel with each other, and the second cord segments laid substantially parallel with each other and crosswise to the first cord segments, the radially outer surface of the first cord segments directly abutting with the radially inner surface of the second cord segments, the ribbon being folded back at the first axial edge from radially outward to inward and at the second axial edge from radially inward to outward, and the zigzag pitch being substantially equal to the circumferential width of the ribbon multiplied by an integer, said integer being one (1), whereby the ribbon segments are arranged tightly in the circumferential direction of the tire, wherein the belt further includes a layer made of a strip of conventional tire fabric.

4. The tire according to claim 1, wherein, with respect to the tire equator, the first cord segments are inclined symmetrically to the second cord segments.

5. The tire according to claim 1, wherein said belt includes two layers of a ribbon of rubber, a radially inner layer and a radially outer layer, the outer layer having width different from the inner layer, the two layers being wound around the carcass while running zigzag between the first and second axial edges of the belt to define ribbon segments extending between the first and second axial edges of the belt, the outer layer being formed by winding the ribbon continuously from the inner layer in the same manner as the inner layer, but changing the axial extent W of the zigzag from that of the inner layer.

6. The tire according to claim 1 wherein the fabric belt layer is disposed radially inward of the first cord segments.

7. The tire according to claim 1 wherein the fabric belt layer is disposed radially outward of the second cord segments.

8. The tire according to claim 2 wherein the fabric belt layer is disposed radially inward of the first cord segments.

9. The tire according to claim 2 wherein the fabric belt layer is disposed radially outward of the second cord segments.

10. The tire according to claim 3 wherein the fabric belt layer is disposed radially inward of the first cord segments.

11. The tire according to claim 3 wherein the fabric belt layer is disposed radially outward of the second cord segments.

* * * * *